(12) United States Patent
Penkkimäki

(10) Patent No.: US 8,287,260 B2
(45) Date of Patent: Oct. 16, 2012

(54) AIR VENTING VALVE OF VULCANISING MOULD

(75) Inventor: Pekka Penkkimäki, Siuro (FI)

(73) Assignee: WD Racing Oy, Tampere (FI)

( * ) Notice: Subject to any disclaimer, the term of this patent is extended or adjusted under 35 U.S.C. 154(b) by 218 days.

(21) Appl. No.: 12/668,315

(22) PCT Filed: Jul. 9, 2008

(86) PCT No.: PCT/FI2008/000086
§ 371 (c)(1),
(2), (4) Date: Jan. 8, 2010

(87) PCT Pub. No.: WO2009/007493
PCT Pub. Date: Jan. 15, 2009

(65) Prior Publication Data
US 2010/0201048 A1      Aug. 12, 2010

(30) Foreign Application Priority Data

Jul. 11, 2007   (FI) .................................... 20075535

(51) Int. Cl.
*B29C 33/10*   (2006.01)
(52) U.S. Cl. ................. 425/28.1; 425/472; 425/812
(58) Field of Classification Search ............... 425/28.1, 425/472, 812; 249/141
See application file for complete search history.

(56) References Cited

U.S. PATENT DOCUMENTS

| 3,854,852 A * | 12/1974 | Carter .......................... 425/28.1 |
| 4,347,212 A | 8/1982 | Carter |
| 4,351,789 A | 9/1982 | Sidles et al. |
| 4,492,554 A * | 1/1985 | Carter .......................... 425/28.1 |
| 4,708,609 A * | 11/1987 | Yoda et al. ................... 425/28.1 |
| 5,922,237 A | 7/1999 | Green |
| 5,939,101 A | 8/1999 | Green |
| 6,871,831 B1 | 3/2005 | Cuny et al. |
| 6,923,629 B2 * | 8/2005 | Ahn et al. .................... 425/28.1 |
| 2009/0095406 A1 * | 4/2009 | Cazzanti et al. ............. 156/111 |

FOREIGN PATENT DOCUMENTS

| AU | 710458 B2 | 5/1997 |
| EP | 0 774 333 A2 | 5/1997 |
| EP | 1 380 397 A2 | 1/2004 |
| EP | 1 779 989 A1 | 5/2007 |
| FI | 106938B B1 | 5/2001 |
| GB | 922788 | 4/1963 |
| GB | 2339163 | * 1/2000 |
| JP | 60-232914 A | 11/1985 |
| JP | 2-214616 | * 8/1990 |
| JP | 2006-103026 A | 4/2006 |
| WO | WO-2006/070411 A1 | 7/2006 |
| WO | WO-2007/084087 A2 | 7/2007 |
| WO | WO 2007/100308 A2 | 9/2007 |

* cited by examiner

*Primary Examiner* — James Mackey
(74) *Attorney, Agent, or Firm* — Birch, Stewart, Kolasch & Birch, LLP

(57) ABSTRACT

An air venting valve and method for removing air from a vulcanizing mold of a vehicle tire by the aid of an air venting valve having a body functioning as an air channel and an inner part movable in a longitudinal direction. The body includes a stem and a valve disc disposed at an inner end of the stem on the side of a mold surface, the diameter of the valve disc is larger than the inner diameter of the body. A spring member is arranged in the air venting valve for forcing the inner part in a predetermined position for opening the valve when a blank is removed from the vulcanizing mold. The lower part of the inner part of the body includes an outer thread and in the lower part of the body a respective inner thread for screwing the valve stem in the body.

6 Claims, 3 Drawing Sheets

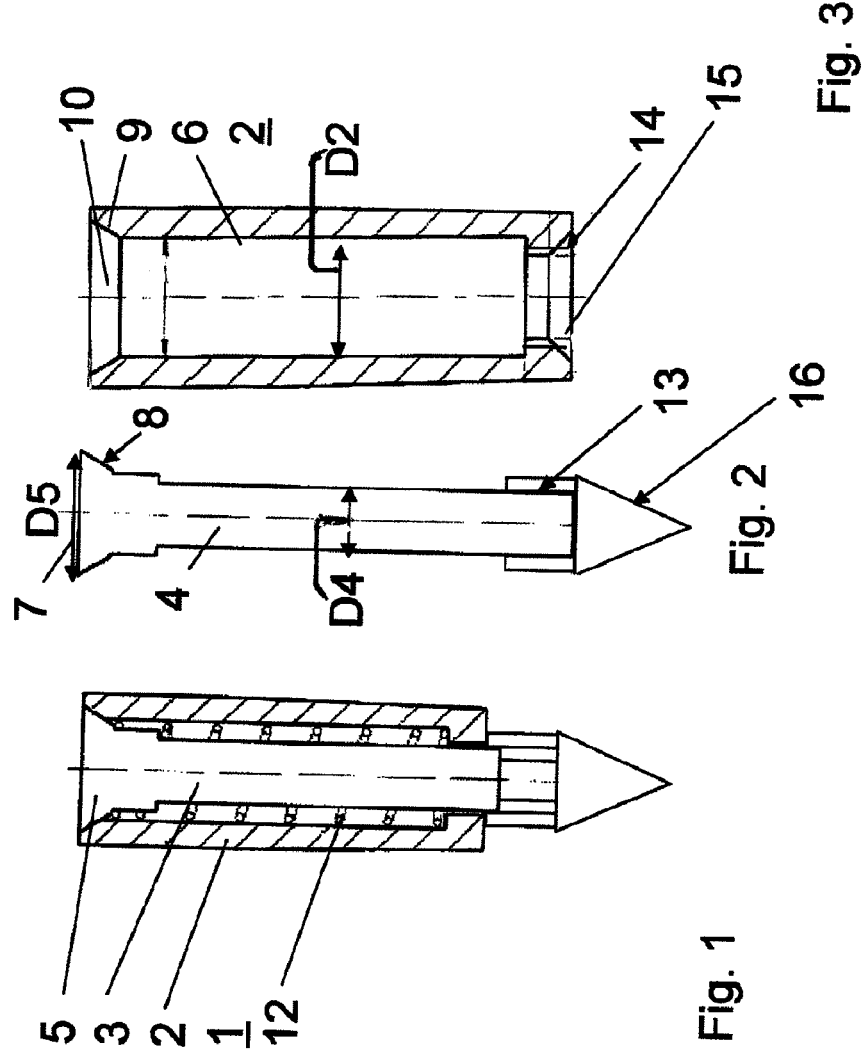

Valve closed (by external force)

Valve open (by springback factor)

AIR VENTING VALVE OF VULCANISING MOULD

FIELD OF ART

This invention relates to an air venting valve for removing air from a vulcanising mould.

In the air venting valve, there is a body functioning as an air channel and an inner part moving in its longitudinal direction which comprises a stem, an outer diameter of which is smaller than an inner diameter of the body, and a valve disc at the inner end of the stem on the side of a mould surface, a diameter of which valve disc is larger than the inner diameter of the body.

The valve disc supports itself in a closing position of the air venting valve on a stop surface in the body and is in an open position at a clearance from said stop surface.

Furthermore, a spring member has been arranged in the air venting valve for forcing the inner part in a predetermined position, particularly for opening the valve when a blank is removed from the vulcanising mould.

The invention also relates to a method for removing air from a vulcanising mould of a vehicle tyre by means of an air venting valve.

PRIOR ART

In the vulcanising moulds of vehicle tyres, air venting holes or channels are used because, in the vulcanising of the tyre, a tyre blank smaller than the inner dimensions of the mould is placed inside the mould, after which the mould is closed and, after which closing, the tyre blank is caused to expand whereby it presses against the surface of the mould in its plastic mode acquiring the size and shape of a tyre. In connection with closing the vulcanising mould, air between the tyre blank and the mould surface has to be removed in order for the surface of the tyre blank to come into a tight contact with the mould surface.

There should be several of these air removal holes or channels in order for air to be removed completely at each point of the mould and no air pockets to remain between the tyre and the mould.

Specifications EP0774333 and U.S. Pat. No. 4,347,212 describe an air venting valve to be used in air venting channels in vulcanising moulds of vehicle tyres, in which there are a stem inside the air venting channel, thinner than the diameter of the channel, and a valve disc which is fast in the stem and is located in the area of the mould surface. On the inner surface of the mould, there is a stop recess for the valve disc. Around the stem is located a coil spring which supports itself in the mould and the valve disc either directly or via the stem and a flange fastened in it. The spring tries to press the valve disc away from the mould wall towards the tyre blank, whereby air is able to exit the mould via a clearance between the valve disc and the stop recess and further via a gap between the stem and the air venting channel. As the material being vulcanised, when expanding, advances towards the mould surface, it pushes ahead of it the valve disc which then finally presses tightly in the stop recess closing the air channel, whereby the material being vulcanised cannot access the air venting channel. The spring then opens the valve as the tyre blank is removed from the mould.

A disadvantage of known air venting valves is particularly their complex structure and awkward installability. The air venting valve according to specification U.S. Pat. No. 4,347,212 has no actual body in the valve and the fastening takes place from the backside of the mould. At its bottom, there is a nut by which the valve stem is locked in place. The valve cannot be replaced without detaching the whole valve from the mould or replacing the valve is extremely difficult. In the arrangement according to specification EP0774333, again, the stem is somewhat longer than the air venting channel and, due to the dismantling possibility of the valve sleeve, the stop has been implemented by a snap joint between the valve stem and the valve body realised by a clearance or, respectively, by a snap joint between the valve and each segment of the vulcanising mould realised by a clearance. In these known arrangements, the valve cannot be replaced without detaching the whole valve from the mould or replacing the valve is extremely difficult. In the arrangement according to specification EP0774333, replacing the valve is relatively awkward.

SUMMARY OF INVENTION

The object of this invention is to eliminate the disadvantages of known prior art and to provide a totally novel air venting valve to be used in the vulcanising moulds of vehicle tyres.

In the arrangement according to the invention, the valve body is detachable and the valve can be installed from the front, whereby there can be projections in the valve in its body for turning it closed/open.

Also the inner part of the valve can be detachably arranged to the body. For this, there is a thread in the lower part of the valve stem. There is a respective thread in the lower part of the valve body (the lower part of the channel). Locking is provided by screwing the valve stem past the thread of the body i.e., in the installation stage, the valve disc is screwed through the body, whereby it stays permanently fast.

This is possible because the inner part is substantially longer than the body, and because there is a 0.2-0.6 mm functional aperture (clearance) in the valve. When the thread in the valve stem ends, it stays fast because the thread part is larger than the free hole when they are not within each other.

With the arrangement according to the invention, the following advantages are gained:
  the arrangement is simultaneously both permanently fast and detachable,
  precise opening is provided,
  installing is possible in the last stage of the process,
  replacing is possible without having to replace the whole valve.

The characteristic features of the arrangement according to the invention will be described in detail in the independent claims and advantageous embodiments in the dependent claims.

BRIEF DESCRIPTION OF DRAWINGS

In the following, the invention will be described in detail by means of an example with reference to the accompanying drawings in which FIGS. 1-3 show an air venting valve according to the invention and an inner part and a body of the air venting valve separately.

DETAILED DESCRIPTION OF ADVANTAGEOUS EMBODIMENT OF INVENTION

Figure 4:
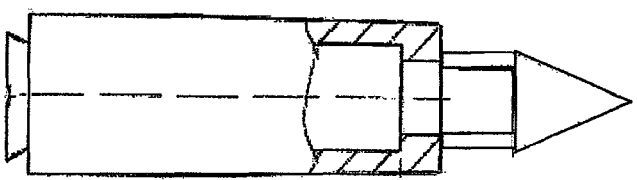
FIGS. 4 and 5 show the operation of the air venting valve according to the invention.

The inner surface of the vulcanising mould of a vehicle tyre provides the vulcanised tyre its outer surface shape and tread patterns with their details in the tread area. Thus, on the mould surface of the vulcanising mould which shapes the tread there are, inter alia, bulges forming tread grooves and recesses forming pattern parts. In the vulcanising mould, there is a large set of air venting valves 1 in which there is a cylindrical body 2 smooth of its outer surface or provided with outer threads, within which is formed an air venting channel, which channels are advantageously both in the area of the tread and in the area of the tyre sides which is not shown in the figures. The air venting channels extend through the wall of the vulcanising mould from inside the mould outside the mould.

There are different numbers of the air venting valves 1 in the vulcanising moulds of vehicle tyres depending on the size and type of the tyre. For example, there are typically 700-900 and 2,000-2,400 air venting channels, respectively, in the summer and winter tyres of passenger cars.

In the air venting valve 1, there are, in the longitudinal direction of the body functioning as an air venting channel, a moving inner part 3 which comprises a stem 4, an outer diameter D4 of which is smaller than an inner diameter D2 of the body, and a valve disc 5 at an inner or upper end of the stem 4 on the side of a mould surface. A centre line of the stem 4 is straight and is located inside the body 2 which is also straight of its centre line and, furthermore, the lengthwise direction of the stem is the same as the longitudinal direction of the body, whereby the stem is able to move freely in the body in its longitudinal direction.

A gap between the stem 4 and an inner wall 6 of the body 2 forms the actual air flow channel. The outer diameter D4 of the stem is typically between 0.5 mm-1.4 mm and advantageously between 0.6 mm-1.2 mm in the case of passenger car tyres and between 0.7 mm-2 mm and advantageously between 0.9 mm-1.6 mm in the case of lorry tyres.

A diameter D5 of the valve disc is larger than the inner diameter D2 of the body and e.g. between 1.5 mm-4 mm and advantageously between 1.8 mm-3 mm in the case of passenger car tyres and between 3 mm-8 mm and advantageously between 3.2 mm-6 mm in the case of lorry tyres.

A front surface 7 of the valve disc, which is directed towards the inside of the vulcanising mould and comes into contact with the outer surface of the tyre blank in a way described below, is usually planar or can have been shaped concave or convex either irrespective of a predetermined surface shape of the tyre or in accordance with a predetermined surface shape of the tyre.

A support surface 8 of the valve disc, which valve disc in the closing position of the air venting valve (FIG. 4) supports itself on a stop surface 9 of the body 2, can typically be of the shape of a truncated cone. The shapes of the support surface 8 of the valve disc and the stop surface 9 of the body on the side of the vulcanising mould are thus congruent such that they set tightly against each other in the closing position of the air venting valve. The stop surface 8 being of the shape of a truncated cone, it forms a recess 10 on the inner surface of the mould, in which the valve disc in said closing position sets so that the front surface of the valve disc comes substantially on the same level or on the same height with the inner surface of the mould at that point. The diameter of the recess is substantially equal to the diameter of the valve disc.

In the air venting valve, a coil spring 12 is pressed between an inner edge 11 at the lower end of the body 2 and the valve disc 5, which spring keeps the moving inner part 3 formed by the described stem 4 and the valve disc 5 extended in the direction of the inside of the vulcanising mould, whereby the air venting valve can be in its open position in which the valve disc is a clearance away from the stop surface.

In the valve according to the invention, there is e.g. a 0.2-0.8 mm functional aperture (clearance). Furthermore, the inner part 3 is substantially longer than the body and, further in the arrangement according to the invention, there is an outer thread 13 in the lower part of the valve stem. A respective inner thread 14 is in the lower part of the valve body (the lower part of the channel), between the edge 11 and a lower edge 15. Thus, it is possible to provide locking by screwing the valve stem past the thread of the body i.e., in the installation stage, the valve disc is screwed through the body, whereby it stays permanently fast.

For facilitating installation, an end 16 of the inner part is downwards convergent e.g. in the shape of a cone.

The air venting valve 1 according to the invention operates in the following way for removing air from the vulcanising mould of the vehicle tyre during the vulcanisation of the tyre:

A tyre blank is set in the vulcanising mould, which blank is caused to expand by pressing air and/or steam inside of it, whereby the outer surface of the tyre blank presses against the mould surface gaining its final surface shape, i.e. the surface pattern of the tyre tread, from it. At the same time, the vulcanising mould is heated for vulcanising the rubber material of the tyre blank and for achieving the finished tyre. In order for the outer surface of the tyre blank to set as precisely as possible against the inner surface of the mould, air is removed from between the tyre blank and the mould surface via air venting valves, air venting channels and their possible extensions.

For installing the air venting valve, in the arrangement according to the invention, the valve body is detachable and the valve can be installed from the front i.e. from the opposite side of the mould either by pressing or by rotating, whereby there can be projections in the valve in its body for turning it closed/open.

In the lower part of the valve stem, there is a thread as described above. There is a respective thread in the lower part of the valve body (the lower part of the channel). Locking is provided by screwing the valve stem past the thread of the body i.e., in the installation stage, the valve disc is screwed through the body, whereby it stays permanently fast. When the thread in the valve stem ends, it stays fast because the thread part is larger than the free hole when they are not within each other.

For installing the inner part of the valve, either a spanner, a magnet or a combination tool of them is used. When using the spanner, there is a shaping at the upper end of the valve for using the spanner.

For removing is required either pressing the valve from behind the mould and rotating or a magnet for lifting the valve for 0.4 mm and simultaneously for rotating the valve stem in the open direction. For removing is used a special tool which is either a spanner or a magnet or their combination. With the magnet, the valve can be lifted against a springback factor whereby the thread in the stem can be set in place for screwing it off.

Figure 5:
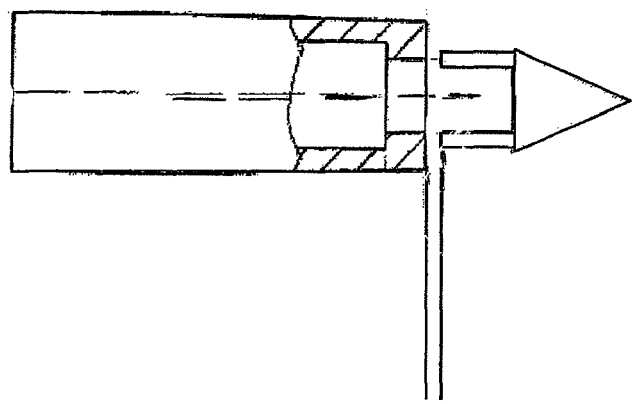

FIGS. 4 and 5 further show a valve according to the invention when closed (by an external force, FIG. 4) and when open (by a springback factor, FIG. 5).

Figure 6:
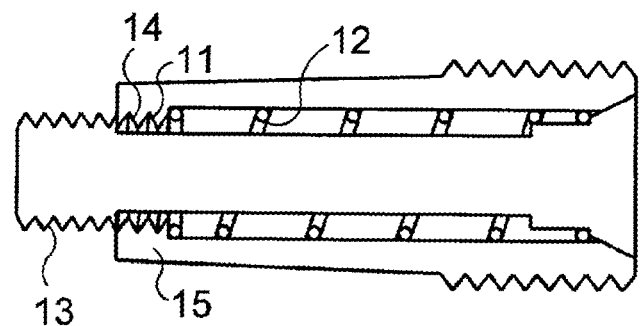
FIGS. 6, 7 and 8 show the valve stem and the valve body individually and when in operative engagement.
Figure 7:
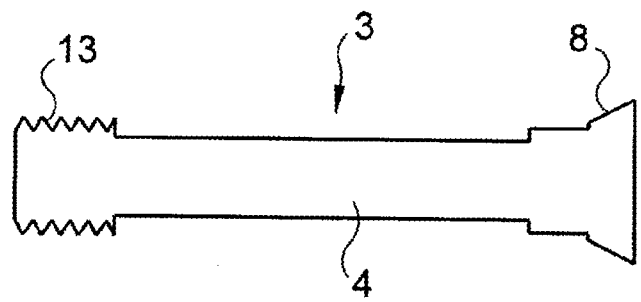
Figure 8:
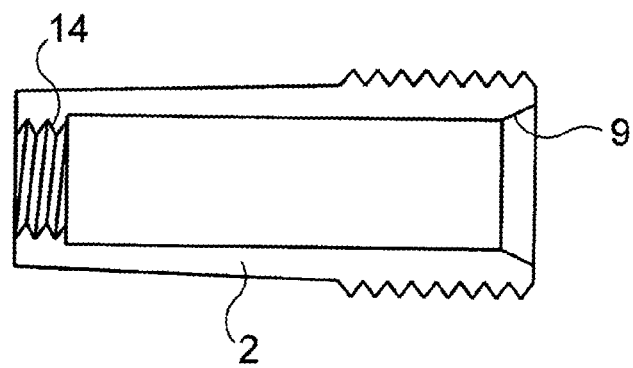

FIG. 6 shows the engaging relationship between the valve stem and the valve body; FIG. 7 shows the valve stem and FIG. 8 shows the valve body.

It is well known by those skilled in the art that the different embodiments of the invention are not solely limited to the example described above, but they may vary within the scope of the appended claims. The invention can also be applied to others than the vulcanising moulds of a vehicle tyre, whereby, by using an outer thread or an outer thread in which is installed a stopper to prevent the valve from rotating too deeply, the tolerance demand of the boring can be diminished and the breaking in the installation stage or respectively the detachment of the valve due to too large a hole can be prevented.

The invention claimed is:

1. An air venting valve for removing air from a vulcanizing mould of a vehicle tire which comprises:
    a valve body having a substantially cylindrical inner surface functioning as an air channel,
    a valve stem movable in its longitudinal direction within the valve body, said valve stem having an outer diameter which is smaller than the inner diameter of the valve body, defining an air flow channel therebetween,
    a valve disc disposed at one end of the valve stem at the side of a mould surface, the diameter of said valve disc being larger than the inner diameter of the valve body,
    wherein said valve disc supports itself in a closed position of the air venting valve on a stop surface of the valve body and defines an open position at a clearance from said stop surface,
    wherein a spring member is disposed in the air flow channel for forcing the valve stem in a predetermined open position when a blank is removed from the vulcanizing mould, and
    wherein the valve body is provided with an internal thread at an end opposite to the stop surface of the valve body, and the valve stem is provided with an external thread at an end opposite to the valve disc, whereby the valve stem is adapted to be screwably installed in the valve body.

2. The air venting valve according to claim 1, wherein the vulcanizing mould is a vulcanizing mould of a vehicle tire, and
    wherein the valve stem is substantially longer than the valve body so that when the valve stem is screwably installed, a portion of its threaded end extends beyond the threaded end of the valve body.

3. The air venting valve according to claim 2, wherein a convergent end element of the value body is engaged with the threaded, extended end of the valve stem.

4. The air venting valve according to claim 1, wherein the valve disc is in the shape of a truncated cone and the stop surface has a complimentary recess.

5. The air venting valve according to claim 1, wherein the valve body is detachable from the valve stem.

6. The air venting valve according to claim 1, wherein the valve body is installed by rotation.

* * * * *